United States Patent

Inukai et al.

[11] Patent Number: 5,867,798
[45] Date of Patent: Feb. 2, 1999

[54] CORDLESS TELEPHONE SYSTEM HAVING POWER INTERRUPTION DETECTION

[75] Inventors: Shinichiro Inukai, Yokohama; Katsuhiro Taura, Miyagi-ken; Takeshi Ishihara, Machida, all of Japan

[73] Assignee: Matsushita Electric Industrial Co., Ltd., Osaka, Japan

[21] Appl. No.: 768,224

[22] Filed: Dec. 17, 1996

Related U.S. Application Data

[63] Continuation of Ser. No. 312,754, Sep. 27, 1994, abandoned.

[30] Foreign Application Priority Data

Nov. 22, 1993 [JP] Japan ..................................... 5-291718
Nov. 22, 1993 [JP] Japan ..................................... 5-291720

[51] Int. Cl.$^6$ ..................................................... H04Q 7/20
[52] U.S. Cl. .............................................. 455/573; 320/2
[58] Field of Search ................................ 379/61; 320/14, 320/21, 20, 35, 30, 2; 455/573

[56] References Cited

U.S. PATENT DOCUMENTS

| | | | |
|---|---|---|---|
| 4,419,616 | 12/1983 | Baskins et al. | 320/2 |
| 4,458,111 | 7/1984 | Sugihara . | |
| 4,726,052 | 2/1988 | Kato et al. . | |
| 4,939,770 | 7/1990 | Makino | 379/61 |
| 4,979,205 | 12/1990 | Haraguchi et al. | 379/61 |
| 5,151,643 | 9/1992 | Emmert et al. | 320/2 |
| 5,172,043 | 12/1992 | Toops | 320/2 |
| 5,233,644 | 8/1993 | Yamagata et al. | 379/61 |
| 5,256,955 | 10/1993 | Tomura et al. | 320/2 |
| 5,274,320 | 12/1993 | Yamaguchi et al. | 320/31 |
| 5,371,784 | 12/1994 | Yankura | 379/61 |
| 5,479,486 | 12/1995 | Saji | 307/11 |
| 5,659,236 | 8/1997 | Hahn | 320/2 |
| 5,680,027 | 10/1997 | Hiratsuka et al. | 320/2 |

FOREIGN PATENT DOCUMENTS

| | | |
|---|---|---|
| 0 331 194 A2 | 9/1989 | European Pat. Off. . |
| 1-177748A | 7/1989 | Japan . |
| 2 230 922 | 10/1990 | United Kingdom . |
| 2 242 793 | 10/1991 | United Kingdom . |
| 2 262 400 | 6/1993 | United Kingdom . |
| 2 262 401 | 6/1993 | United Kingdom . |

*Primary Examiner*—William Cumming
*Attorney, Agent, or Firm*—Spencer & Frank

[57] ABSTRACT

In a cordless telephone system having a mobile telephone set and a charging stand, the mobile telephone set includes at least one charging terminal and a charging control terminal, and control circuitry for monitoring the at least one charging terminal and the charging control terminal, and controlling whether or not the mobile telephone set is permitted to operate in a quick communication mode. The quick communication mode is a communication mode of the mobile telephone set in which the mobile telephone set automatically begins to transmit an outgoing call of the telephone system or to receive an incoming call, when the mobile telephone set is picked up from the charging stand.

13 Claims, 7 Drawing Sheets

CORDLESS TELEPHONE SYSTEM HAVING POWER INTERRUPTION DETECTION

This application is a continuation, of application Ser. No. 08/312,754, filed Sep. 27, 1994 abandoned.

BACKGROUND OF THE INVENTION

This invention relates to telephone systems including an analog cordless telephone system, a digital cordless telephone system and a portable radio telephone system, and more particularly to a cordless telephone system in which means are provided for controlling the process of charging a secondary battery built into a mobile telephone set or a portable radio telephone set and for establishing a quick communication mode ready for starting to originate an outgoing call or answering an incoming call as soon as the mobile telephone set or the portable radio telephone set is taken up from a charging stand.

In a cordless telephone system of this kind, its mobile telephone set is charged by loading it on a charging stand or a charging part of its stationary telephone set, so that it can operate with a quick communication mode when unloaded, as disclosed in, for example, JP-A-1-177748. The disclosure of the cited publication is such that, when the mobile telephone set is unloaded from the charging stand or from the charging part of the stationary telephone set, the voltage appearing at the charging terminal of the mobile telephone set when the mobile telephone set is unloaded from the charging stand or charging part changes from that appearing at the charging terminal when the mobile telephone set is kept loaded on the charging stand or charging part, and this voltage change is detected by a control part to permit starting to originate an outgoing call or answering an incoming call without pushing down the hook button of the mobile telephone set.

However, in the case of the prior art cordless telephone system, the voltage appearing at the charging terminal of the mobile telephone set when the mobile telephone set is kept loaded on the charging stand or on the charging part of the stationary telephone set and that appearing at the charging terminal when the mobile telephone set is unloaded from the charging stand or charging part are detected to determine the voltage change, and this voltage change is used to permit starting to originate an outgoing call or answering an incoming call without pushing down the hook button of the mobile telephone set. Therefore, when the supply of the charging voltage from the charging stand or from the charging part of the stationary telephone set is stopped due to an interruption of supply of commercial power from an AC power source or operational failure of a DC power supply supplying the DC voltage, for example, the internal control of the mobile telephone set is unable to accurately distinguish between the situation where power supply failure has occurred and the situation where the mobile telephone set is unloaded from the charging stand to permit starting to originate an outgoing call. Thus, the prior art cordless telephone system has had the problem of setting up a quick communication mode ready for starting to originate an outgoing call or answering an incoming call even in the event of an interruption of commercial power from the AC power source.

SUMMARY OF THE INVENTION

With a view to solve such a prior art problem, it is an object of the present invention to provide an excellent cordless telephone system in which the situation where the voltage supply to its mobile telephone set is stopped as a result of completion of the process of voltage charging is distinguished from the situation where the voltage supply to the mobile telephone set is stopped due to an interruption of the supply of commercial power from an AC power source or operational failure of a DC power supply, so that the mobile telephone set can be freed from an incorrect operation when the voltage supply is stopped and so that the mobile telephone set can reliably operate with the quick communication mode.

According to one aspect of the present invention which attains the above object, there is provided a cordless telephone system comprising a mobile telephone set including a charging terminal and a charging control terminal supplying a charging voltage to a built-in secondary battery, and a charging stand supplying the charging voltage, generated by converting a commercial power supply voltage from an AC power source by a DC power supply, to the secondary battery built in the mobile telephone set through the charging terminal and the charging control terminal, the mobile telephone set including charging voltage detecting means for detecting whether the charging voltage from the charging stand through the charging terminal and the charging control terminal is simultaneously stopped or supplied, and quick communication control means for controlling establishment of a quick communication mode ready for starting to originate an outgoing call or answering an incoming call on the basis of the result of detection by the charging voltage detecting means detecting whether the charging voltage is simultaneously stopped or supplied when the mobile telephone set is unloaded from or loaded on the charging stand, the charging stand including decision means for deciding whether or not generation of the charging voltage from the DC power supply is stopped for reasons including interruption of the commercial power supply voltage from the AC power source, and control means for rending the quick communication mode inactive by delaying the voltage supplied to the charging control terminal for a predetermined period and then lowering the voltage level when the decision means decides that generation of the charging voltage is stopped.

In the cordless telephone system having the construction described above, the quick communication mode becomes active when the charging voltage detecting means detects that the charging voltage from the charging stand to the charging terminal and the charging control terminal are simultaneously stopped or supplied when the mobile telephone set is unloaded from or loaded on the charging stand. Also, when the voltage supply is stopped due to interruption of the commercial power supply from the AC power source, failure of the DC power supply, etc., a negative charging terminal is electrically opened earlier than a positive charging terminal, and the charging control terminal holds a predetermined voltage for a predetermined period. On the basis of this holding voltage, the decision means decides that generation of the charging voltage from the DC power supply is stopped due to reasons including interruption of the commercial power supply voltage from the AC power source, and the quick communication mode is rendered inactive.

DESCRIPTION OF THE PREFERRED EMBODIMENTS

Preferred embodiments of the cordless telephone system according to the present invention will now be described in detail by reference to the drawings.

Figure 1:
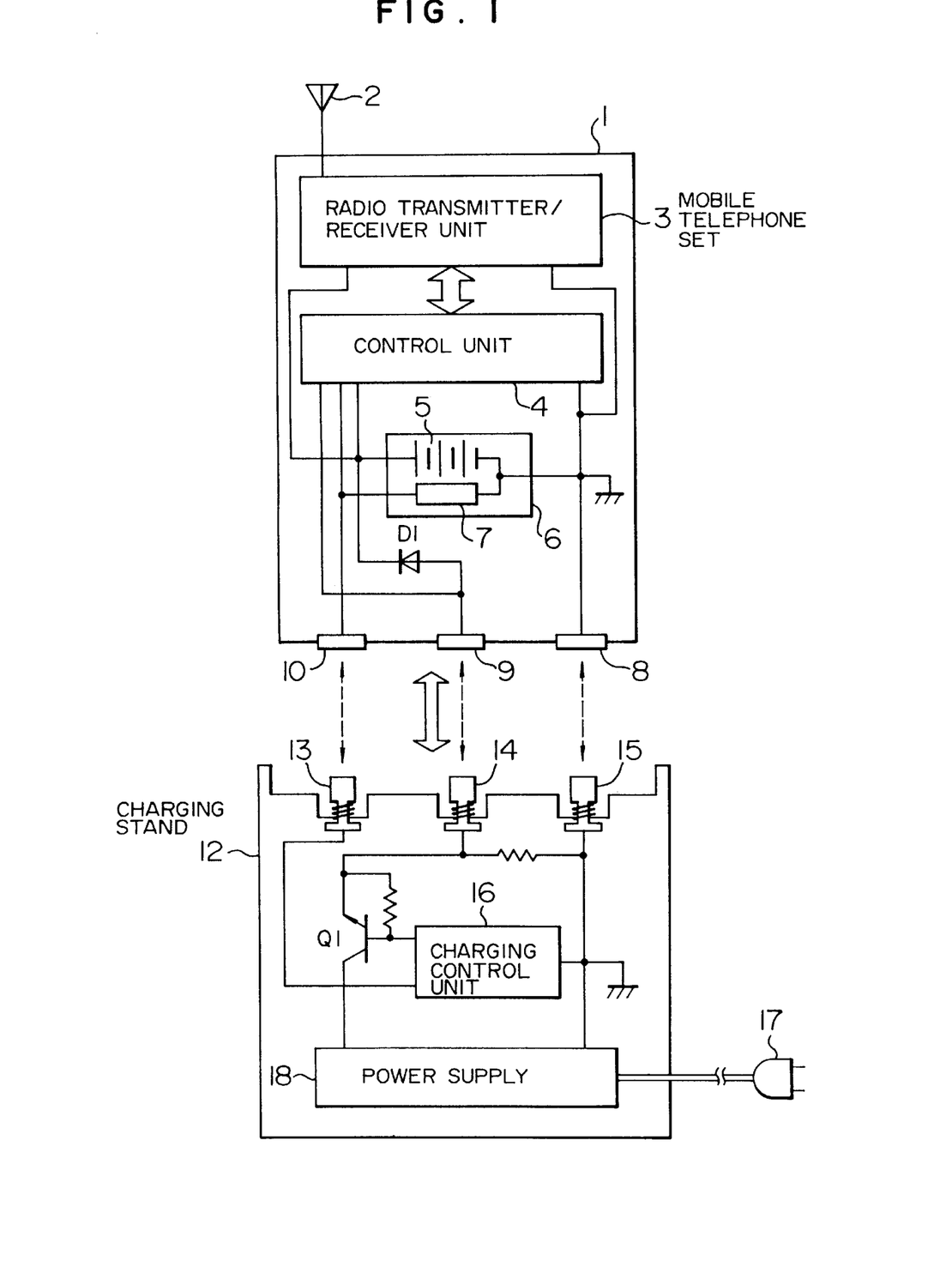
FIG. 1 is a block diagram showing the structure of an embodiment of the cordless telephone system according to the present invention.

FIG. 1 is a block diagram showing the structure of a first embodiment of the cordless telephone system according to the present invention. Referring to FIG. 1, the cordless telephone system includes a mobile telephone set 1 for making radio telecommunication with a stationary telephone set (not shown) and a charging stand 12 on which the mobile telephone set 1 is loaded to be charged. The mobile telephone set 1 includes an antenna 2 for the dual function of radio transmission and reception and a radio transmitter/receiver unit 3 for processing radio speech information to be transmitted from and received by the antenna 2. This radio transmitter/receiver unit 3 includes a transmitter/receiver consisting of a microphone and a speaker for speech, a dial button matrix which is manipulated for inputting, for example, a telephone number, and a display. Further, a control unit 4 in the form of, for example, a microprocessor for controlling various circuits is incorporated in the mobile telephone set 1 to carry out various functions including telephone number input control, radio speech information transmission and reception control, secondary battery voltage monitoring operation, charging terminal voltage detection, and outgoing call origination starting and incoming call answering (a quick communication mode). In the mobile telephone set 1, a secondary battery 5 that is a power source is accommodated in the form of a battery pack 6.

A charging control unit 7, such as a thermistor, is disposed within the battery pack 6 to detect the temperature of the secondary battery 5. At the lower part of the mobile telephone set 1 shown in FIG. 1, a negative (−) charging terminal 8 is connected to the negative terminal of the secondary battery 5, to the control unit 4 and to the radio transmitter/receiver unit 3, and a positive (+) charging terminal 9 is connected to the positive terminal of the secondary battery 5, to the control unit 4 and to the radio transmitter/receiver unit 3. Further, in the mobile telephone set 1, a charging control terminal 10 is connected to one end of the charging control unit 7 and to the control unit 4, and a reverse current blocking diode D1 is connected between the positive (+) charging terminal 9 and the positive terminal of the secondary battery 5.

The charging stand 12 includes a positive (+) charging terminal 14 and a negative (−) charging terminal 15. When the mobile telephone set 1 is loaded on the charging stand 12, the positive (+) charging terminal 14 contacts the positive (+) charging terminal 9 by the resiliency of a coil spring to supply required charging power to the secondary battery 5, while the negative (−) charging terminal 15 contacts the negative (−) charging terminal 8 by the resiliency of a coil spring to ground the secondary battery 5. The charging stand 12 further includes a charging control terminal 13 and a charging control unit 16. The charging control terminal 13 contacts the charging control terminal 10 by the resiliency of a coil spring, and the charging control unit 16 carries out various kinds of charging control including charging voltage monitoring/control, charging current monitoring/control, and charging period control. The charging stand 12 further includes a control transistor Q1 and a power supply unit 18. The charging control unit 16 controls the base bias voltage of the control transistor Q1, so that the control transistor Q1 controls the charging voltage and the charging current supplied to the secondary battery 5 through the positive (+) charging terminal 14 and the negative (−) charging terminal 15. The power supply unit 18 generates a DC voltage from an AC voltage supplied by a plug cord 17 connected to an AC power source, and this DC voltage is supplied to the positive (+) charging terminal 14 through the emitter and the collector of the control transistor Q1.

The operation of the cordless telephone system embodying the present invention will now be described.

Figure 2:
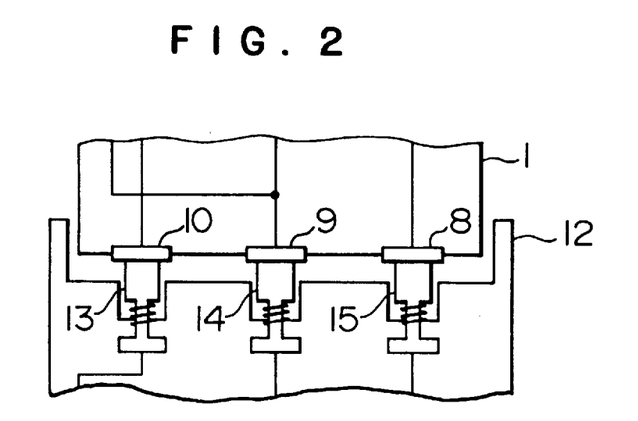
FIG. 2 is a side elevational view showing the state of contact between the charging terminals when the mobile telephone set is loaded on the charging stand in the embodiment shown in FIG. 1.

FIG. 2 is a side elevational view showing the state of contact between the charging terminals when the mobile telephone set 1 is loaded on the charging stand 12. It will be seen in FIG. 2 that the positive (+) charging terminal 9, the charging control terminal 10 and the negative (−) charging terminal 8 belonging to the mobile telephone set 1 are in contact with the positive (+) charging terminal 14, the charging control terminal 13 and the negative (−) charging terminal 15 belonging to the charging stand 12, respectively.

Figure 3A:
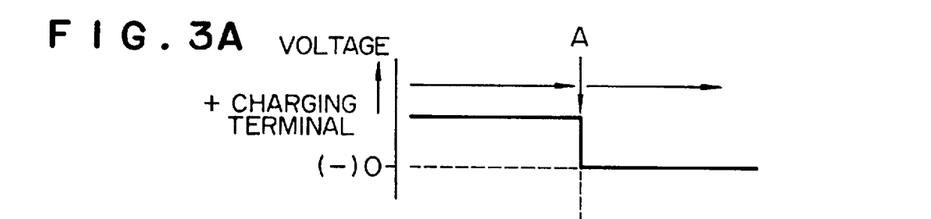
FIGS. 3A and 3B are signal waveform diagrams showing how the voltage at the plus (+) charging terminal and that at the charging control terminal change relative to time in the embodiment shown in FIG. 1.
Figure 3B:
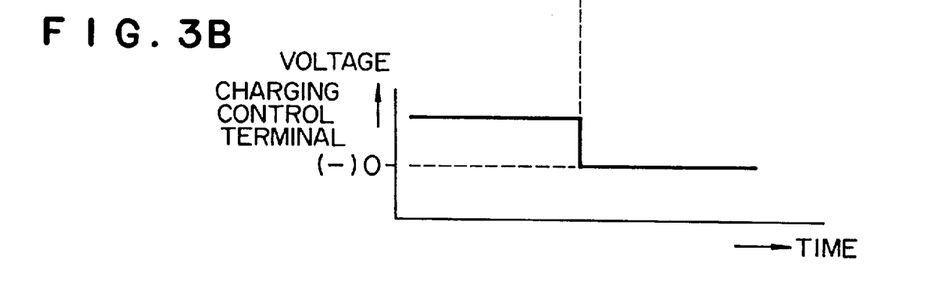

FIGS. 3A and 3B are signal waveform diagrams respectively showing how the voltage at the positive (+) charging terminal 9 and that at the charging control terminal 10 change relative to time. It will be seen that the normal voltage appears at each of the positive (+) charging terminal 9 and the charging control terminal 10 of the mobile telephone set 1. The control unit 4 receiving these voltages detects that the mobile telephone set 1 is loaded on the charging stand 12.

Figure 4:
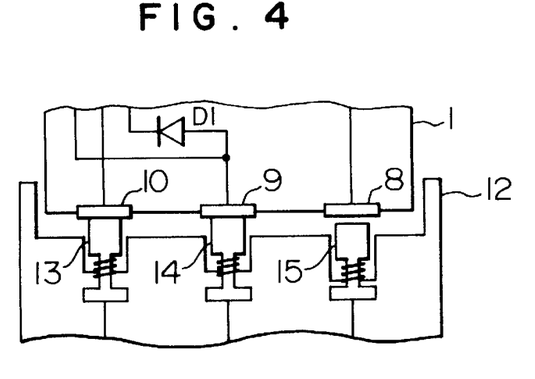
FIG. 4 is a side elevational view showing the state of contact between the charging terminals when the mobile telephone set is unloaded from the charging stand in the embodiment shown in FIG. 1.

FIG. 4 is a side elevational view showing the state of contact between the charging terminals when the mobile telephone set 1 is unloaded from the charging stand 12. It will be seen in FIG. 4 that the stroke of the negative (−)

charging terminal 15 springing out in the upward direction in FIG. 4 by resiliency of the coil spring is selected to be shorter than those of the positive (+) charging terminal 14 and the charging control terminal 13, so that the negative (−) charging terminal 15 is released from contact with the mating negative (−) charging terminal 8 earlier than the others when the mobile telephone set 1 is unloaded from the charging stand 12. The point A in FIGS. 3A and 3B shows how the voltage at the positive (+) charging terminal 9 and that at the charging control terminal 10 of the mobile telephone set 1 change when the negative (−) charging terminal 8 is electrically opened. As soon as the negative (−) charging terminal 8 of the mobile telephone set 1 is opened, the voltage at the positive (+) charging terminal 9 and that at the charging control terminal 10 drop to the level of 0 volts. Therefore, the control unit 4 of the mobile telephone set 1, detecting this zero volt level, decides that the mobile telephone set 1 is unloaded from the charging stand 12.

Figure 5:
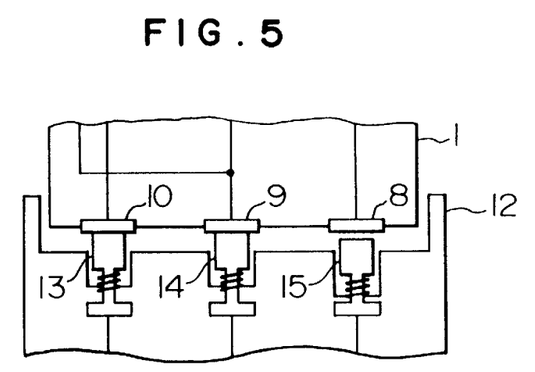
FIG. 5 is a side elevational view of a modified state of contact between the charging terminals in the embodiment shown in FIG. 1.
Figure 6:
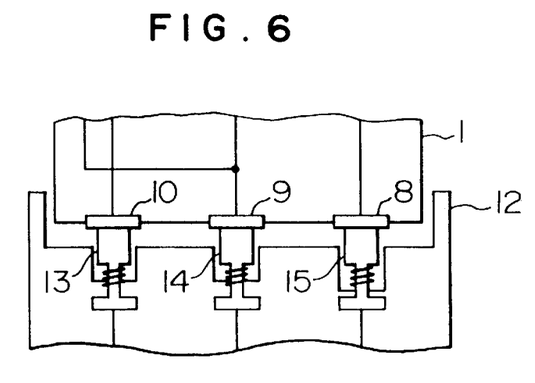
FIG. 6 is a side elevational view showing the state of contact between the charging terminals when the mobile telephone set is loaded on the charging stand in the modification shown in FIG. 5.

FIG. 5 is a side elevational view of a modification of the arrangement of the positive (+) charging terminal 14 and the negative (−) charging terminal 15. FIG. 6 is a side elevational view showing the state of contact of the positive (+) charging terminal 14 and the negative (−) charging terminal 15 with the associated charging terminals in the case of the modification shown in FIG. 5 when the mobile telephone set 1 is loaded on the charging stand 12. In the modification shown in FIGS. 5 and 6, the contact members of the positive (+) charging terminal 14 and the negative (−) charging terminal 15 have the same structure as that of the corresponding charging terminals shown in FIG. 2. The contact member of the negative (−) charging terminal 15 is disposed deep in the structural member of the charging stand 12. Thus, the negative (−) charging terminal 15 is released earlier than the positive (+) charging terminal 14 to open the contact.

How the voltages at the positive (+) charging terminal 9 and the negative (−) charging terminal 8 change when the power supply to the charging stand 12 from the AC power source is interrupted will be described in both the case where the mobile telephone set 1 is unloaded from the charging stand 12 and the case where the mobile telephone set 1 is kept loaded on the charging stand 12.

Figure 7A:
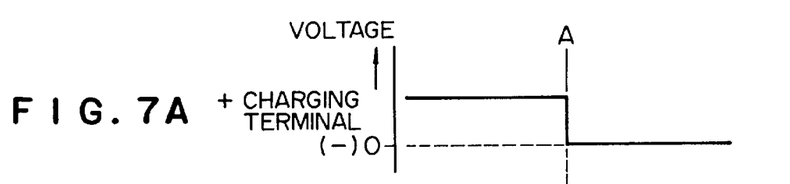
FIGS. 7A and 7B are signal waveform diagrams showing how the voltage changes when the mobile telephone set is unloaded from the charging stand in the embodiment shown in FIG. 1.
Figure 7B:
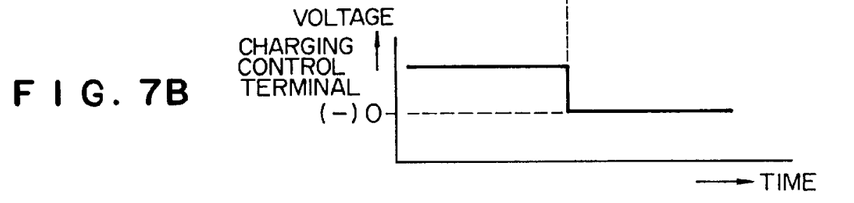

FIGS. 7A and 7B show how the voltages change when the mobile telephone set 1 is unloaded from the charging stand 12. The point A shows the change of the voltage at each of the positive (+) charging terminal 9 and the charging control terminal 10 when the negative (−) charging terminal 8 is electrically opened, and it will be seen that the voltage changes at both the positive (+) charging terminal 9 and the charging control terminal 10 occur at the same time.

Figure 8A:
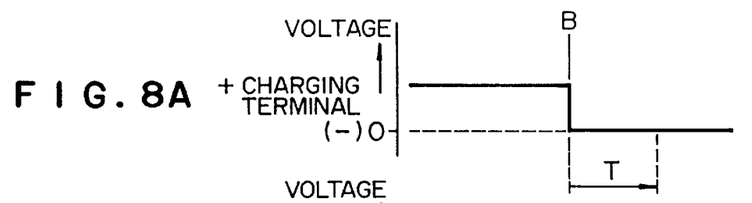
FIGS. 8A and 8B are signal waveform diagram showing how the voltage changes when the mobile telephone set is kept loaded on the charging stand in the embodiment shown in FIG. 1.
Figure 8B:
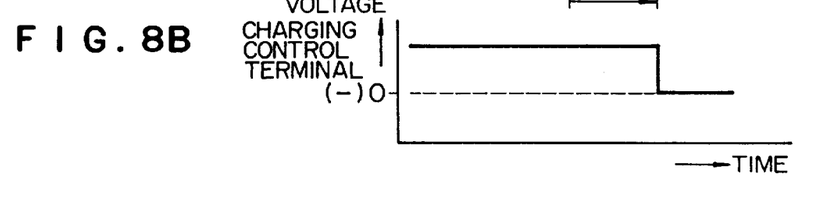

FIGS. 8A and 8B are signal waveform diagrams showing how the voltages change when the mobile telephone set 1 is kept loaded on the charging stand 12. In FIG. 8A, the voltage at the positive (+) charging terminal 9 drops to the level of 0 volts as shown at the point B in the event of interruption of the power supply. That is, the control transistor Q1 shown in FIG. 1 for controlling the charging current is turned off at the time corresponding to the point B, and, after a period of time T, the voltage at the charging control terminal 10 drops to the level of 0 volts. In such a case, the control unit 4 decides that the power supply to the mobile telephone set 1 from the AC power source is interrupted. The length of the period T is preferably selected to be, for example, about 0.5 sec, and, the delay amounting to the period T may be easily attained by the use of a conventional timer utilizing the discharge of a capacitor.

Figure 9:
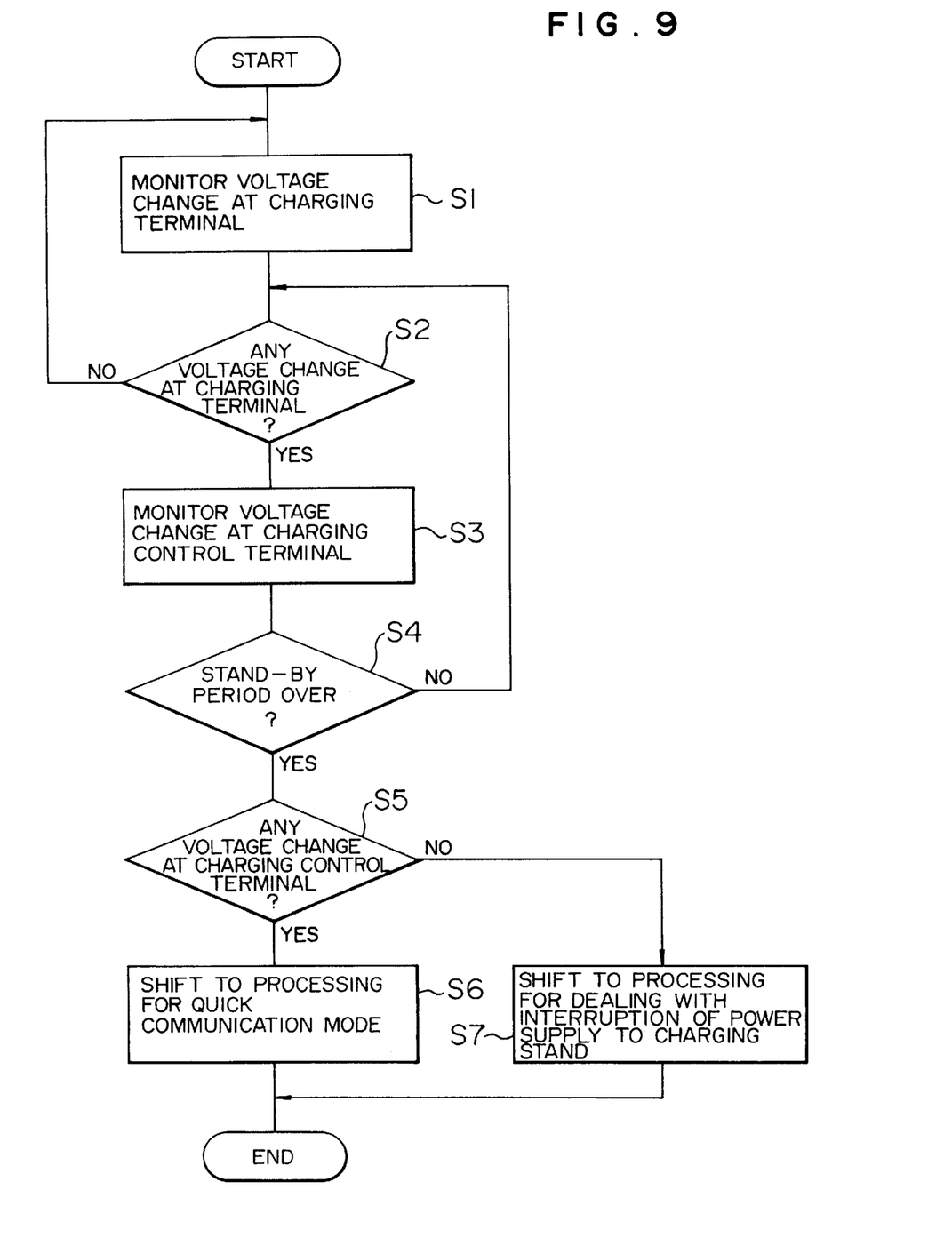
FIG. 9 is a flow chart of steps of processing by the control of the mobile telephone set in the embodiment shown in FIG. 1.

FIG. 9 is a flow chart showing the steps of processing by the control unit 4 of the mobile telephone set 1. In a step S1 in FIG. 9, the control unit 4 continuously monitors for an occurrence of a voltage change at the positive (+) charging terminal 9 (FIG. 1) when the mobile telephone set 1 is kept loaded on the charging stand 12. In a step S2, whether or not the voltage at the positive (+) charging terminal 9 has changed is checked. When the result of checking is Yes and proves that the voltage has dropped to the level of 0 volts, the control unit 4 monitors, in a step S3, for an occurrence of a voltage change at the charging control terminal 10 (FIG. 1). In this step of voltage change monitoring, a predetermined stand-by period is provided so as to avoid incorrect operation due to noise and also to eliminate the adverse effect of chattering of the contacts due to mechanical vibration, thereby completely preventing the possibility of incorrect operation. The length of this stand-by period is selected to be shorter than that of the delay period T shown in FIG. 8. In a step S4, the control unit 4 checks whether or not the stand-by period has ended. In a step S5, whether or not the voltage at the positive (+) charging terminal 9 and that at the charging control terminal 10 have changed is detected. When the result of detection in the step S5 is Yes and proves that both the voltage at the positive (+) charging terminal 9 and that at the charging control terminal 10 have dropped to the level of 0 volts, the step S5 is followed by a step S6 in which the operation of the mobile telephone set 1 shifts to a quick communication mode ready for starting to originate an outgoing call or answering an incoming call. On the other hand, when the result of detection in the step S5 is No and proves that the voltage at the positive (+) charging terminal 9 is at the level of 0 volts, while the voltage appears at the charging control terminal 10, the step S5 is followed by a step S7 in which required processing to deal with an interruption of the power supply to the charging stand 12 is executed.

The ground level and the zero voltage level referred to in the above description of the first embodiment of the present invention represent the value that can be detected by the control unit 4 as the voltage changes at the positive (+) charging terminal 9 and the charging control terminal 10. In a practical circuit design, this value is less than about 50% of the charging voltage and the charging control voltage (about 4 volts) when, for example, a CMOS device is used as an input circuit element or about 0.5 to 0.7 volts when a transistor is used as an input circuit element.

A second embodiment of the cordless telephone system according to the present invention will now be described in detail by reference to the drawings.

Figure 10:
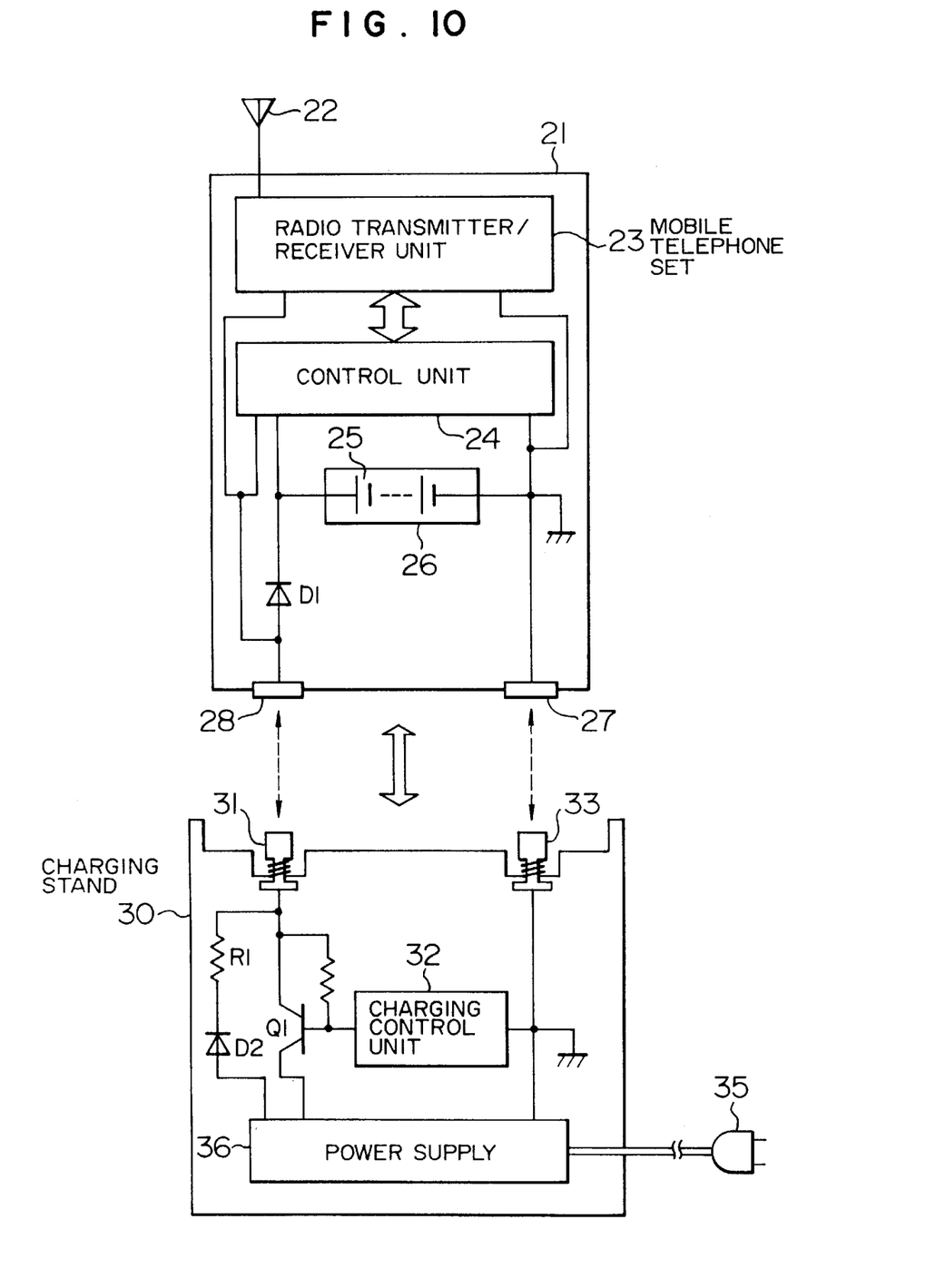
FIG. 10 is a block diagram showing the structure of a second embodiment of the cordless telephone system according to the present invention.

FIG. 10 is a block diagram showing the structure of the second embodiment of the cordless telephone system according to the present invention. Referring to FIG. 10, the cordless telephone system includes a mobile telephone set 21 for making radio telecommunication with a stationary telephone set (not-shown), and a charging stand 30 on which the mobile telephone set 21 is loaded to be charged. The mobile telephone set 21 includes an antenna 22 serving the dual function of radio transmission and reception, and a radio transmitter/receiver unit 23 processing radio speech information to be transmitted from and received by the antenna 22. This radio transmitter/receiver unit 23 includes a transmitter/receiver consisting of a microphone and a speaker for speech, a dial button matrix which is manipulated for inputting, for example, a telephone number, and a display. Further, a control unit 24 in the form of, for example, a microprocessor for controlling various circuits is incorporated in the mobile telephone set 21 to carry out various functions including telephone number input control, radio speech information transmission and reception control, lithium-ion type secondary battery voltage monitoring operation, charging terminal voltage detection, and outgoing call origination starting and incoming call answering control (a quick communication mode). In the mobile telephone set 21, a secondary battery of lithium ion type 25 that is a power source is accommodated in the form of a battery pack 26. At the lower part of the mobile telephone set 21 shown in FIG. 10, a negative (−) charging terminal 27 is connected to the negative terminal of the secondary battery 25 of lithium ion type, to the control unit 24 and to the negative terminal of the radio transmitter/receiver unit 23, and a positive (+) charging terminal 28 is connected to the positive terminal of the secondary battery 25 of lithium ion type, to the control unit 24 and to the positive terminal of the radio transmitter/receiver unit 23.

Further, in the mobile telephone set 21, a reverse current blocking diode D1 is connected between the positive (+) charging terminal 28 and the positive terminal of the secondary battery 25 of lithium ion type.

The charging stand 30 includes a positive (+) charging terminal 31 and a charging control unit 32. When the mobile telephone set 21 is loaded on the charging stand 30, the positive (+) charging terminal 31 contacts the positive (+) charging terminal 28 by the resiliency of a coil spring to supply the required charging voltage to the secondary battery 25 of lithium ion type. The charging control unit 32 carries out various charging control including charging voltage monitoring/control, charging current monitoring/control and charging period control. The charging stand 30 further includes a negative (−) charging terminal 33 contacting the negative (−) charging terminal 27 by resiliency of a coil spring when the mobile telephone set 21 is loaded on the charging stand 30, and a control transistor Q1 whose base bias voltage is controlled by the charge control unit 32 so as to control the charging voltage and the charging current supplied to the secondary battery 25 of lithium ion type through the positive (+) charging terminal 31.

The charging stand 30 further includes a power supply unit 36, a reverse current blocking diode D2, and a current limiting resistor R1. The power supply unit 36 generates a DC voltage from an AC voltage supplied by a plug cord 35 connected to the AC power source and supplying the DC voltage to the positive (+) charging terminal 31 through the emitter and the collector of the control transistor Q1. The reverse current blocking diode D2 prevents reverse flow of the current toward the power supply unit 36. The current limiting resistor R1 is interposed between the cathode of the reverse current blocking diode D2 and the positive (+) charging terminal 31 so as to limit the current flow.

The operation of the second embodiment of the present invention will now be described. Referring to FIG. 10, when the mobile telephone set 21 is loaded on the charging stand 30, the positive (+) charging terminal 28 and the negative (−) charging terminal 27 belonging to the mobile telephone set 21 make contact with the corresponding positive (+) charging terminal 31 and the negative (−) charging terminal 33 belonging to the charging stand 30 respectively.

Figure 11:
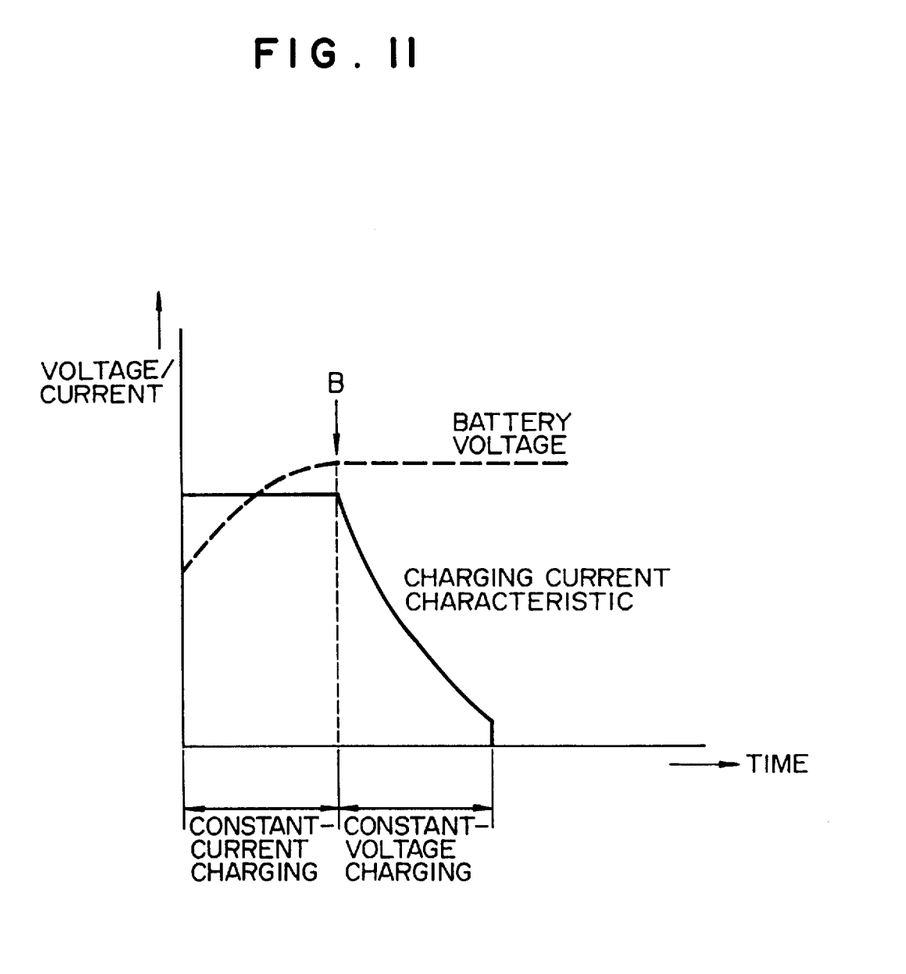
FIG. 11 is a graph showing the charging characteristic of a secondary battery of lithium ion type used in the second embodiment shown in FIG. 10.

As a result of the above contact between the charging terminals, a predetermined charging voltage and current are supplied through the positive (+) charging terminal 28 of the mobile telephone set 21 in the forward direction of the reverse current blocking diode D1 to the secondary battery 25 of lithium ion type, thereby charging the secondary battery 25 of lithium ion type. The secondary battery 25 of lithium ion type is charged according to the charging characteristic curve shown in FIG. 11. After the secondary battery 25 of lithium ion type is completely charged, a voltage lower than the test end voltage of the secondary battery 25 of lithium ion type is supplied from the power supply unit 36 to the positive (+) charging terminal 31 through the reverse current blocking diode D2 and the current limiting resistor R1. That is, when, for example, the mobile telephone set 21 is continuously operated for telecommunication over a considerably long period, the voltage charged in the secondary battery 25 of lithium ion type will be consumed to the extent that speech is no longer possible with the remaining quantity of the charged voltage. The power supply part 36 supplies such a quantity of the voltage after the secondary battery 25 of lithium ion type is completely discharged.

The secondary battery 25 of lithium ion type in the second embodiment of the present invention is charged as described above. That is, after the mobile telephone set 21 is loaded on the charging stand 30 in the charging starting stage, the high voltage is supplied from the power supply unit 36 to the positive (+) charging terminal 28 to be supplied to the secondary battery 25 of lithium ion type. After the charging is completed, the voltage lower than the test end voltage of the secondary battery 25 of lithium ion type is supplied from the power supply unit 36. By comparing these two voltages, the control unit 24 in the mobile telephone set 21 can recognize whether or not the mobile telephone set 21 is loaded on the charging stand 30. After the control unit 24 recognizes that the mobile telephone set 21 is unloaded from the charging stand 30, and when the control unit 24 detects then that the voltage supply to the positive (+) charging terminal 28 is stopped as a result of unloading of the mobile telephone set 21 from the charging stand 30, the control unit 24 can control the so-called quick communication mode ready for starting to originate an outgoing call or answering an incoming call. Further, because the reverse current blocking diode D1 can block flow of a reverse voltage from the secondary battery 25 of lithium ion type, the control unit 24 can accurately detect the voltage appearing at the positive (+) charging terminal 28, so that, as soon as the mobile telephone set 21 is taken up from the charging stand 30, the mobile telephone set 21 can reliably operate with the so-called quick communication mode ready for starting to originate an outgoing call or answering an incoming call.

Further, because the voltage lower than the test end voltage of the secondary battery 25 of lithium ion type can be supplied to the positive (+) charging terminal 31 after the charging is completed, undesirable overcharging of the secondary battery 25 of lithium ion type can be prevented, so that undesirable degradation of the operation characteristic attributable to such overcharge would not be likely to occur.

In this second embodiment of the present invention, the power supply voltage is supplied from the power supply unit 36 to the secondary battery 25 of lithium ion type through the reverse current blocking diode D2 and the current limiting resistor R1. However, an effect similar to that described above can also be exhibited even when the base of the control transistor Q1 is controlled by the charging control unit 32 so as to supply the power supply voltage through the control transistor Q1.

What is claimed is:

1. In a cordless telephone system having a mobile telephone set and a charging stand for supplying power to the mobile telephone set when the mobile set is placed on the charging stand, the mobile telephone set including:

a charging terminal and a charging control terminal; and control means for monitoring for a change in voltage at the charging terminal of the mobile telephone set after the mobile telephone set has been placed on the charging stand, monitoring for a change in the voltage at the charging control terminal of the mobile telephone set if the voltage at the charging terminal changes to a predetermined value, operating the mobile telephone set in a quick communication mode if the voltage at the charging terminal and the voltage at the charging control terminal both change to the predetermined value substantially simultaneously, the quick communication mode being a communication mode in which the mobile telephone set starts to originate an outgoing call or to answer an incoming call when the mobile telephone set is taken up from the charging stand, and deciding that the mobile telephone set is no longer receiving power from the charging stand even though it has not been taken up from the charging stand if the voltage at the charging terminal changes to the predetermined value but the voltage at the charging control terminal does not change to the predetermined value substantially simultaneously.

2. A cordless telephone system comprising:

a mobile telephone set having at least one charging terminal and a charging control terminal, and a charging stand for supplying a charging voltage to terminals of the mobile telephone set, wherein the charging stand includes first control means for reducing the charging voltage supplied to the charging control terminal of the mobile telephone set to a low level after a lapse of a predetermined time period when the first control means detects stopping of generation of the charging voltage from a DC voltage supply, the stopping including interruption of a supply of power to the DC voltage supply from an external AC power source, and wherein the mobile telephone set includes second control means for:

(a) permitting the mobile telephone set to operate in a quick communication mode when the second control means detects that supply of the charging voltage to both of the at least one charging terminal and the charging control terminal of the mobile telephone set are simultaneously stopped, and (b) not permitting the mobile telephone set to operate in the quick communication mode when the second control means detects that a time period of stopping to supply the charging voltage to the charging control terminal is longer than a time period of stopping to supply the charging voltage to the at least one charging terminal, and wherein the quick communication mode is a communication mode of the mobile telephone set in which the mobile telephone set starts to originate an outgoing call or to answer an incoming call, when the mobile telephone set is taken up from the charging stand.

3. A cordless telephone system according to claim 2, wherein the at least one charging terminal comprises a positive charging terminal and a negative charging terminal, and, wherein, when the mobile telephone set is unloaded from the charging stand, the negative charging terminal is electrically opened earlier than the positive charging terminal.

4. A cordless telephone system comprising:

a mobile telephone sets, and a charging stand, wherein the charging stand includes:

a first charging terminal and a first charging control terminal, for supplying to the mobile telephone set a charging voltage generated from a DC power supply connected to an AC power source, and first control means for reducing the charging voltage supplied to the first charging control terminal to a low level after a lapse of a predetermined time period when the first control means detects stopping of generation of the charging voltage from the DC power supply including interruption of supply of power from the AC power source, wherein the mobile telephone set includes:

a second charging terminal and a second charging control terminal, for supplying the charging voltage to a built-in battery received through the first charging terminal and the first charging control terminal, and second control means for:

(a) permitting the mobile telephone set to operate in a quick communication mode when the second control means detects that supply of the charging voltage to both the first charging terminal and the first charging control terminal is simultaneously stopped, and (b) not permitting the mobile telephone set to operate in the quick communication mode when the second control means detects that the time period of stopping to supply the charging voltage to the second charging control terminal is longer than the time period of stopping to supply the charging voltage to the second charging terminal, and wherein the quick communication mode is a communication mode of the mobile telephone set in which the mobile telephone set starts to originate an outgoing call or to answer an incoming call, when the mobile telephone set is taken up from the charging stand.

5. A cordless telephone system according to claim 4, wherein the second charging terminal is a second positive charging terminal, and wherein, when the mobile telephone set is unloaded from the charging stand, a third, negative charging terminal is electrically opened earlier than the second, positive charging terminal.

6. A cordless telephone system comprising:

a mobile telephone set, and a charging stand, wherein the charging stand includes voltage supply means for supplying a charging voltage to the mobile telephone set, and wherein the mobile telephone set includes:

a battery charged by the charging voltage supplied from the voltage supply means, a reverse current blocking diode for preventing flow of a reverse current to the voltage supply means from the battery, and control means for permitting the mobile telephone set to operate in a quick communication mode, in which the mobile telephone set starts to originate an outgoing call or to answer an incoming call when the mobile telephone set is take up from the charging stand, if it is detected that the voltage supply means is supplying the charging voltage, and for not permitting the mobile telephone set to operate in the quick communication mode if it is detected that the voltage supply means is not supplying the charging voltage.

7. A cordless telephone system according to claim 6, wherein the charging stand includes charging control means for supplying a voltage lower than a discharge termination voltage to the battery after the battery is completely charged.

8. A cordless telephone system according to claim 6, wherein the battery is of lithium ion type.

9. A cordless telephone system according to claim 7, wherein the battery is of lithium ion type.

10. A method of controlling a cordless telephone system which includes a mobile telephone set and a charging stand for supplying a charging voltage and a control signal to the mobile telephone set when the mobile telephone set is placed on the charging stand, comprising the steps of:

(a) in the mobile telephone set, monitoring for changes in the charging voltage and the control signal after the mobile telephone set has been placed on the charging stand;

(b) operating the mobile telephone set in a quick communication mode if substantially simultaneous changes occur in both the charging voltage and the control signal, the quick communication mode being a communication mode in which the mobile telephone set starts to originate an outgoing call or to answer an incoming call when the mobile telephone set is taken up from the charging stand; and (c) deciding that the mobile telephone set is no longer receiving the charging voltage from the charging stand even though it has not been taken up from the charging stand if the charging voltage changes but the control signal does not also change substantially simultaneously.

11. A method of controlling a cordless telephone system which includes a mobile telephone set and a charging stand for supplying power to the mobile telephone set when the mobile telephone set is placed on the charging stand, the mobile telephone set having a charging terminal and a charging control terminal, comprising the steps of:

(a) monitoring for a change in voltage at the charging terminal of the mobile telephone set after the mobile telephone set has been placed on the charging stand;

(b) monitoring for a change in voltage at the charging control terminal of the mobile telephone set if the voltage at the charging terminal changes to a predetermined value;

(c) operating the mobile telephone set in a quick communication mode if the voltage at the charging terminal and the voltage at the charging control terminal both change to the predetermined value substantially simultaneously, the quick communication mode being a communication mode in which the mobile telephone set starts to originate an outgoing call or to answer an incoming call when the mobile telephone set is taken up from the charging stand; and (d) deciding that the mobile telephone set is no longer receiving power from the charging stand even though it has not been taken up from the charging stand if the voltage at the charging terminal changes to the predetermined value but the voltage at the charging control terminal does not changes to the predetermined value substantially simultaneously.

12. The method of claim 11, wherein the predetermined value is zero volts.

13. The method of claim 11, wherein the charging terminal is a first charging terminal, wherein the mobile telephone set additionally has a second charging terminal, wherein the charging stand has first and second charging terminals and a charging control terminal which respectively contact the first charging terminal, the second charging terminal, and the charging control terminal of the mobile telephone set when the mobile telephone set is placed on the charging stand, and wherein the method further comprises the step of breaking contact between the second charging terminals of the mobile telephone set and the charging stand before breaking contact between the first charging terminals and the control terminals of the mobile telephone set and the charging stand when the mobile telephone set is taken up from the charging stand.

\* \* \* \* \*